350-6.91 SR
XR 3,142,224
SEARCH ROOM
CROSS REFERENCE
24
X 2501

July 28, 1964 L. M. ANDREWS ETAL 3,142,224

REFLECTIVE SCANNING PROJECTION SYSTEM

Filed April 10, 1961 2 Sheets-Sheet 1

INVENTORS
Laurence M. Andrews
Jacob Rabinow
William Fischer
BY Joseph A. Genovese & Moe L. Libman
ATTORNEYS

3142224
OR IN 355/47

REFLECTIVE SCANNING PROJECTION SYSTEM

Filed April 10, 1961 2 Sheets-Sheet 2

INVENTORS
Laurence M. Andrews
Jacob Rabinow
William Fischer
BY Joseph A. Genovese & Max L. Libman
ATTORNEYS 3,142,224

REFLECTIVE SCANNING PROJECTION SYSTEM

Laurence M. Andrews, Silver Spring, Jacob Rabinow, Takoma Park, and William Fischer, Silver Spring, Md., assignors, by mesne assignments, to Control Data Corporation, Minneapolis, Minn., a corporation of Minnesota Filed Apr. 10, 1961, Ser. No. 101,929
13 Claims. (Cl. 88—24)

This invention relates to scanning systems and more particularly to optical scanning projection systems.

Although it has been known for a long time that a rotating prism, mirror or other reflective surface could be used for scanning, several practical problems limit their use. These have been of such a serious nature that in a number of instances such scanners have been avoided in the design of equipment which could otherwise well use them. For example, most optical scanning reading machines electronically process the intelligence of a document by first having it optically projected from the document surface in order to make an examination of the image or images thereof. Since reading machines are good examples of a field where our invention will provide an improved technique, the subsequent description shall be limited to reading machines. However reading machines are given by way of example only.

The electronic circuits of modern reading machines are much faster than the present capability of feeding data to the machine. Physical paper moving is one problem which limits the speed of current reading machines, and another is the high-speed projection for optically gathering the information from the document and projecting it onto the face of a photosensitive pick-up device. Our invention solves this latter problem for certain types of reading, including the most common type, i.e. the reading of characters that are arranged in lines such as typewritten sheets, press-printed sheets, cash register strips, etc. The J. Rabinow U.S. Patent No. 2,933,246 shows an optical projection system using a source of light, an oscillating mirror and a lens. Even before this patent, flying spot scanners using rotary mirrors were common knowledge. An ordinary oscillating mirror has inertia and must continually stop and start for each line of characters which limits the speed of scanning. The response time of the mirror is a factor. An ordinary rotary mirror does not have to change rotational direction, but presents problems in the optical geometry. The use of a rotary scanning mirror and a flat intelligence bearing document is accompanied by intolerable distortions of the images in all parts of the line scanned except an exceedingly small portion thereof.

Accordingly, an object of our invention is to provide a rotary optical projection system which overcomes these difficulties by the geometrical relationship between the surface of the document, the axis of rotation of the scanning device and the surface or surfaces thereof. More specifically, we have curved the document with a known radius of curvature and devised a number of ways to scan a typical line thereof with a rotary reflective surface while maintaining favorable optical geometry. The total distance between a lens and the scanning mirror surface, and the scanning surface to the line of characters is either a constant or practically so for the entire line. This eliminates the above mentioned distortion of the character images which the photosensitive pick-up device and/or recognition circuits of a reading machine would not ordinarily tolerate.

An obvious advantage of using a rotary scanner is that it may be operated at high speed without having to stop and start for each line or at least change direction of motion. However, some reading techniques require, or at least suggest, scanning in opposite directions. With our system we still do not have to stop and start the rotary scan device. Instead, we prefer to have duplicate scanning units so that one continually rotates clockwise while the other continually rotates counterclockwise. The data selection, i.e. from the clockwise or counterclockwise member, is made by the electronic circuits of a reading machine.

In one form of our invention we do actually oscillate a reflecting surface to scan a line of data. However, this is a special case where the stopping and starting is achieved with an unusually low power requirement. For instance, we rely on the torsional resonance of a rod to scan a reflective member back and forth over a line.

Other objects and features of importance will become apparent in following the description of the illustrated forms of the invention.

FIGURE 1 is a top plan view, largely diagrammatic, showing a typical relationship between one of our scan systems and the document containing lines of print.

FIGURE 1*a* is a top view of a modification.

FIGURE 1*b* is a top view of another modification.

Figures 1, 1A, 1B, 2, 3:
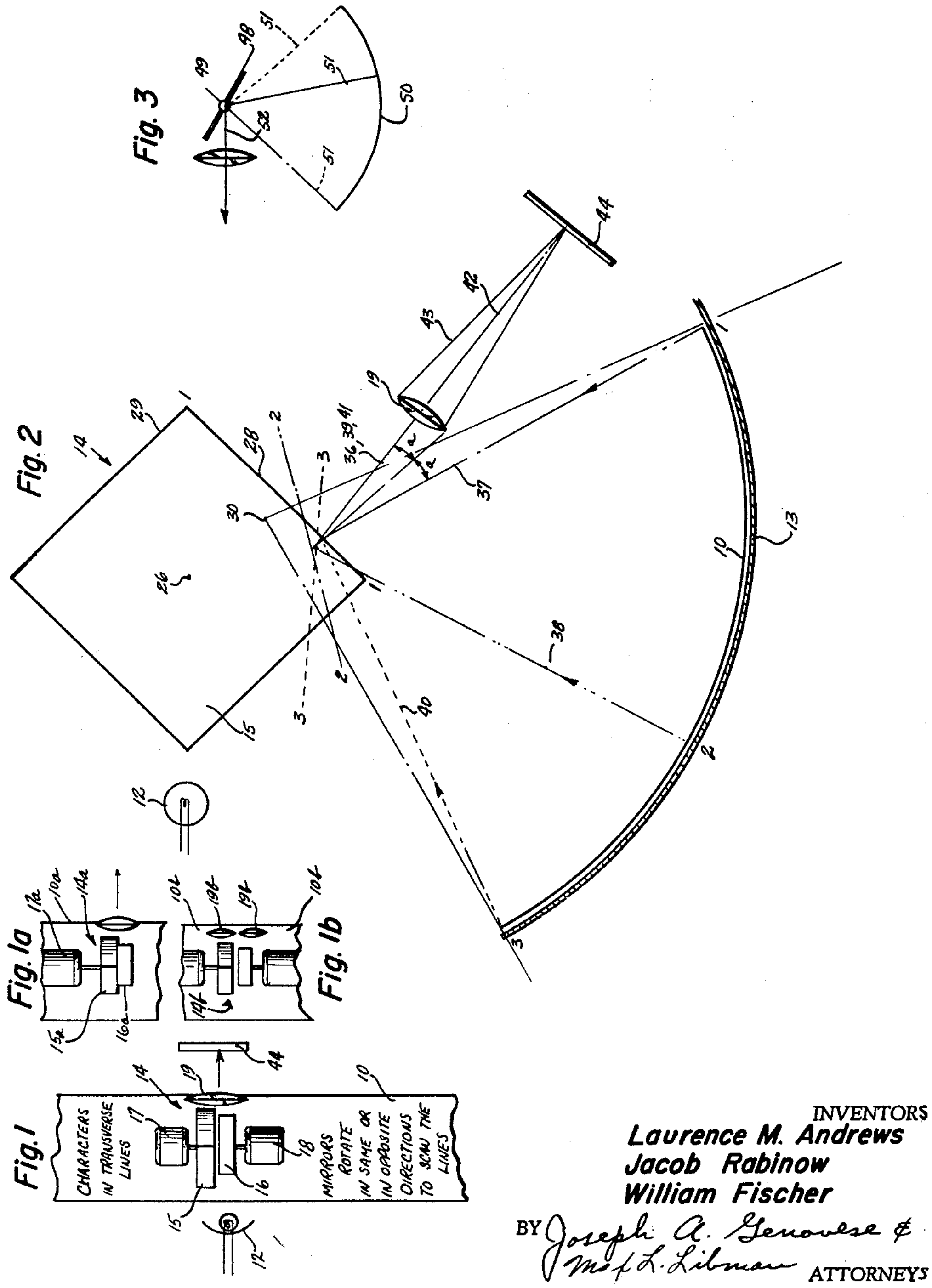
FIGURE 2 is a diagrammatic view showing the geometrical relationship between the rotary scan device, document and selected rays of reflected light.
FIGURE 3 is a diagrammatic view showing another form of our invention.

FIGURE 1 shows a document 10 having lines of characters whose images are projected onto a utilization device for example the photosensitive input device 44 of a reading machine. The document is in the form of a strip, but it is understood that the document may be of any shape such as a page, a slip, and others. The document surface is illuminated by a conventional light source 12, and the illumination may be reflected from the top surface of the document or transmitted through it. Rotary scan device 14 is made of two units having separate reflective members 15 and 16 respectively. Motor 17 rotates member 15 in one direction, for instance clockwise, and motor 18 rotates member 16 in the opposite direction. A single lens 19, large enough to span the two members 15 and 16, e.g. mirrors, projects an image of the characters reflected from members 15 and 16, to the utilization device. The document moved continuously at a constant or variable speed or indexed by a document mover (not shown). Assuming that the characters are formed in lines transverse to the direction of movement of document 10, the reflective members 15 and 16 will scan individual lines when oriented as shown. If members 15 and 16 rotate in opposite direction, one line will be scanned from left to right and the adjacent line scanned from right to left. On the other hand, if members 15 and 16 operate in the same direction, the lines are scanned in one direction. Where the two members 15 and 16 are operated together, one is out of phase with the other, and the phase relationship may be preserved by using suitably phased synchronous motors 17 and 18. D.C. field wound permanent magnet motors may be used. The selection of motors is a matter of choice and in fact, the units 15 and 16 can be mechanically coupled.

FIGURE 1*a* shows document 10*a* being scanned by unit 14*a*. The purpose of this view is to show that one motor may be eliminated if members 15*a* and 16*a* are rotated in the same direction. The members may be coupled and driven by the same shaft of the motor 17*a*. The phase relation between members 15*a* and 16*a* is invariant. FIGURE 1*b* shows document 10*b* being scanned by unit 14*b*. The purpose of this view is to show that lens 19 may be substituted by individual lenses 19*b*, one for each unit.

We shall describe FIGURE 2 first since the system shown therein has certain advantages over other forms of our invention. When a single flat mirror, for instance a front silvered mirror, is used to scan a line (see FIGURE 3) there is an inherent time lag between the actual scanning of a line and the scanning of the next line, or the scanning of the same line a second time. The reason is that a rotary planar mirror must rotate 360° to scan a single line of characters whereas only a portion of the circle which is described, represents useful scan time. The optical projection system shown in FIGURE 2 overcomes this difficulty, i.e. loss of useful time in the scanning of the lines of characters on a document. The system in FIGURE 2 is assumed, for the purposes of discussion, to be the part of unit 14 which includes motor 17 and the rotary reflective member 15. Member 15 is a four-sided figure rotated about a central axis 26. When viewed from the end, member 15 appears as a square with axis 26 at its center. Each side of the figure is flat and light reflective.

Document 10 is arranged and supported in an arc by guide 13. The illustrated arc subtends an angle of 90°. The center 30 of curvature is behind that reflective surface, e.g. 28, of member 15 which is in its duty cycle, and spaced from the axis of rotation 26. With the illustrated geometrical relationship (FIGURE 2) we are able to maintain the optical paths between lens 19, a typical surface 28 of member 15 and the line of characters on document 10 very nearly a constant for all angular positions of the reflective surface 28 during its duty cycle. For positions 1—1 of surface 28 the total distance traversed by rays 36, 37 is the same as the total distance traversed by corresponding rays 38, 39 and 40, 41 at positions 2—2 and 3—3 respectively. Rays 36–41 inclusive are merely the central rays of light cones from document surface 10 to lens 19. The ideal condition, that is, having the rays 36, 39 and 41 and all others corresponding to them meet on a single optical axis 42 of lens 19 is achieved to a practical degree. The cone 43 of light from lens 19 containing the optical axis 42, is directed toward utilization device 44 which may be a screen, mosaic or photocells, photomultiplier, or others.

Consider now the operation of the projection system shown in FIGURE 2. The surface of the document is illuminated by light source 12. An image of a part of document 10 at position 1 thereon will provide a reflected light cone diagrammatically shown as its central ray 37. This ray impinges on surface 28. The angle of incidence (*a*) of ray 37 is equal to the angle of reflection (*a*) so that ray 36, as shown, passes through the optical axis of lens 19 when properly located. Since the radius center 30 of the document is not at surface 28, as it moves to its second position 2—2 another part of surface 28 is used. This is exemplified by ray 38 from document 10 impinging on surface 28 of member 15 and being reflected therefrom. Although the angles of incidence and reflection have different values from those indicated at (*a*, *a*) they are equal, and the reflected ray 39 passes through the optical axis of lens 19. As the surface 28 continues to rotate to position 3—3 a different portion of the surface is used for reflection 41 of ray 40 along the optical axis of lens 19. In each instance, the optical path distance between the document and lens is a constant.

In the example given, document 10 is smoothly curved to subtend an arc of 90°. There is virtually no distortion of the projected images of the characters of a line. The only distortion is at the ends of the line, and this is very small due to the geometry of the illustrated system. However, even this very small amount of distortion which is negligible for reading machine use, may be corrected by changing the curvature of the document slightly at its ends.

A very important feature of this form of our invention is that when surface 28 has completed its duty cycle (scanned an entire line), the next surface 29 of the four-sided FIGURE 15 begins its duty cycle. A rotary reflective member is capable of scanning an arc which subtends an angle twice that of the rotation. In other words a rotary member which turns through an angle of 45° will scan a 90° arc. In optical projection systems for projecting images along a single optical path, e.g. to the pick-up device of a reading machine, the light must be usefully projected. Light which is re-reflected between the document and reflective surface is of no value, nor is light which is reflected from the surface of the scanning member in a direction other than toward the lens (without folding the optical system which is not desirable). These are some of the reasons that flat rotating mirrors, when used alone, are inefficient in the sense that only a small portion of the circle described by the reflective member is useable. In the system shown in FIGURE 2, however, when one surface 28 has completed its duty cycle, the next surface 29 is automatically in position to commence its duty cycle. The last mentioned duty cycle may be used to scan the same line of characters a second time or to scan the next line, depending on whether the document has moved or not.

FIGURE 3 discloses what is probably the simplest case of a planar reflective member 48 which rotates about an axis 49 to scan document 50. In order to have a true comparison between the systems shown in FIGURES 2 and 3, it is assumed that document 50 subtends an arc of 90°. In this form of our invention there is considerable time lost, because the surface 48 has a duty cycle of a small fraction of 360° rotation. In this type of system (FIGURE 3) the center of curvature of the document must be at the axis 49 of rotation so that the reflected ray 51 will remain essentially on a common axis 52 during rotation of the reflective surface. The duty cycle of member 48 is 45°, just as the duty cycle of the reflective surfaces of member 15. In FIGURE 3, however, the remaining 315° after a single scan of the document 50, represents lost time. When both surfaces of mirror 48 are reflective, two 45° scans are obtained, but even then 270° of rotation for each revolution of the shaft 49 are unuseable.

Figure 5:
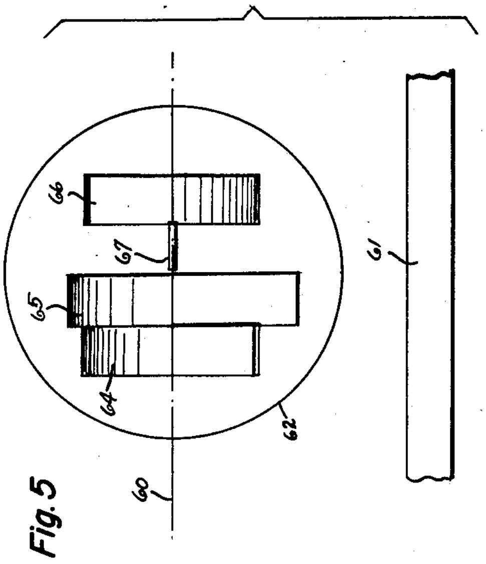
FIGURE 5 is an elevational view of the system shown in FIGURE 4.
Figure 4:
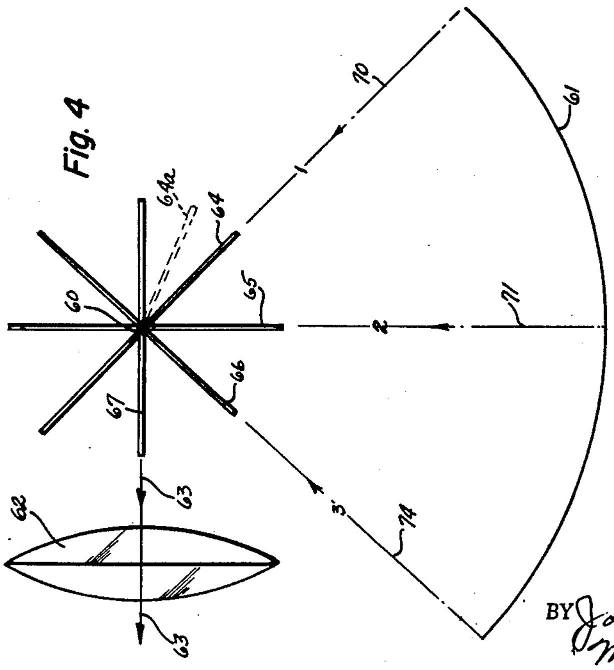
FIGURE 4 is a diagrammatic view showing another form.
Figure 6:
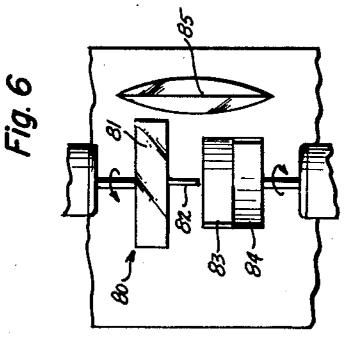
FIGURE 6 is a top diagrammatic view of a further modification.

FIGURES 4–6 show modifications where there is considerable improvement in the duty cycle, but at a loss of some of the light. Loss of light can be very serious in some applications of optical projection systems. For example, optical scanners of reading machines which rely on modern semiconductor photocells, are not nearly so responsive to light as photomultipliers. Thus, the amount of light projected by the optical system is quite important if one is to obtain the advantages (small size, etc.) of semiconductor photocells or other light transducers which do not rely on secondary emission or corresponding amplification systems. Thus, an important advantage of the system shown in FIGURE 2 or 3 is that no serious compromise is made on the quantity of reflected light.

FIGURE 4 shows a rotary scanner having a shaft defining an axis 60 of rotation. The document 61 is curved in an arc of 90°, again, to enable a comparison between the various embodiments disclosed in the drawings. The center of the arc of the document is at the axis 60. Lens 62 has its axis directed toward a utilization device (not shown). In this form of our invention we have a plurality of double-reflective surfaces 64, 65, 66 and 67, each extending from axis 60 and arranged one behind the other along the length of the axis. When four such reflective members are used, they are 45° from each other so that when one completes its duty cycle the next commences its duty cycle. Some of the difficulties, though, are that the reflective members are in tandem as shown in FIGURE 5, and each uses only a fraction of lens 62. This proportionately reduces the light which is transmitted during each scan. As shown in FIGURE 4 the reflective member 64 at position 64*a* reflects the light along line 1 from the right edge portion of document 61 and along the lens axis 63. The reflected light cone is represented by its central ray 70. When member 64 rotates 22½°, the reflected light cone (represented by central 71) is at position 2, and the reflection from the member 64 is along optical axis 63. As member 64 rotates an additional 22½°, the full 90° of document 61 is scanned, the last position being represented by the central ray 74 of a typical light cone and axis 63. As the shaft establishing axis 60 is rotated farther, the next reflective surface begins its duty cycle, and this process continues until all of the members have served their scanning function, after which the member 64 again begins a duty cycle. As the mirrors revolve, each scans across the document 61 in turn.

FIGURE 6 shows a projection system 80 having lens 85 and planar reflective members 81, 82, 83 and 84 capable of counterrotation. The members are coupled in pairs, and are 90° out-of-phase. The purpose of this view is merely to show the out-of-phase relationship between all of the members of system 80 and to show that if it is desired, flat mirrors may be substituted for the multisided figure or figures shown in FIGURES 1, 1*a*, 1*b*, 2.

Figure 7:
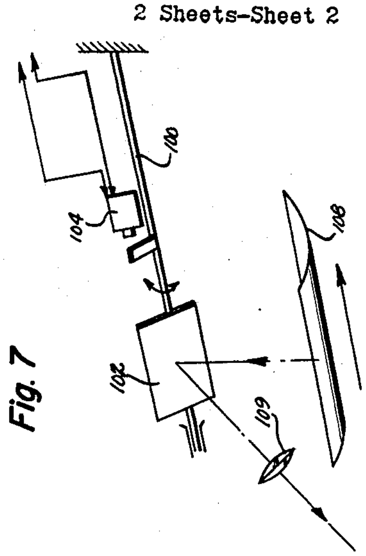
FIGURE 7 is a schematic view showing a resonant system form of our invention.

The system shown in FIGURE 7 relies on the resonance of a rod 100 to oscillate mirror 102 at high speed. An A.C. or a pulsed D.C. driver 104 is coupled with a rod to set it into resonance with the driving signal. Thereafter very little power is required to keep it in a resonant, oscillatory movement condition during which the mirror scans the lines of data on document 108 and projects images thereof on the axis of lens 109. Since the mirror 102 oscillates back and forth, the lines of intelligence on document 108 are scanned in both directions, i.e. back and forth.

In all forms of our invention the document can move with respect to the scanner to bring successive lines of data into the field of view of the scanner. This is not a rigid requirement, though, since the scanner could be moved while the document is at rest, or both may move. Many modifications, changes and the like may be resorted to without departing from the protection of the following claims.

We claim:

1. An optical projection system for a document carrying a line of data, means constraining said document into a concave curve substantially cylindrical at one portion thereof, a lens, rotary scan means to reflect images of successive portions of the line through the axis of said lens while maintaining the total optical distance between said lens and the line essentially equal for each portion of the line that is scanned, thereby maintaining the rays defining the successive images in focus and on a single optical axis, said rotary scan means having an axis of rotation and a reflective surface spaced from said axis, the center of curvature of said concave curve being spaced from said axis of rotation and located between said axis of rotation and said surface.

2. The projection system of claim 1 wherein said scanning means further include additional reflective scanning surfaces serially operative immediately following each other to scan said document and project the scan information through said lens essentially undistorted.

3. The projection system of claim 2 wherein said reflective surfaces each has a duty cycle which is a fraction of a single revolution of said scanning means, the number of said surfaces and the angle through which each surface turns during its duty cycle combining to include the full 360° for each revolution of said scanning means.

4. The projection system of claim 2 wherein the curvature of said document is related to the number of surfaces and the duty cycle angle of said scanning means such that there is essentially no time lag between duty cycles of said surfaces and further there is essentially no time loss in scanning the document during a single 360° revolution of said scanning means.

5. In an optical projection system for a curved document, a single lens, multiple scanning means to separately and individually scan lines of intelligence on the document, said multiple scanning means each having reflective surfaces and each having an independent axis of rotation about which said surfaces rotate independently and separately, the curvature of the document, location of said surfaces and axis of rotation being so related that the optical distance between said lens and the intelligence on said document is esesntially equal for each portion of the lines that are scanned by each individual scanning means so that the rays defining successive images are in focus and on a single optical axis.

6. The projection system of claim 5 wherein said surfaces are multiple mirrors forming a multisided geometrical figure.

7. The projection system of claim 5 wherein said reflected surfaces are mirror arranged at an angle to each other and radial to their axes of rotation.

8. The projection system of claim 6 wherein one scanning means rotates in one direction and the other scanning means rotates in the opposite direction.

9. The projection system of claim 5 wherein the reflecting surfaces of said scanning means are out of phase with each other and rotate in opposite directions.

10. In an optical projection system for lines of data occupying small elemental areas of a larger area, a lens, a scanner having a reflective surface, means to move the scanner about an axis, means to retain the area in a curved condition facing said scanner with the center of curvature being behind said surface, said axis and the plane of said reflective surface being related to each other and to said center of curvature that the total length of the reflected image-defining rays from each elemental area to the lens along the optical axis of the lens is substantially equal for all the elemental areas of the line that are scanned, the relation being such that the portion of the reflective surface which reflects light from the curve surface of the data area along the optical axis of the lens, moves closer to the data area as it moves further from the lens, and vice versa, so that said total length remains substantially constant as the area is scanned.

11. In an optical projection system for lines of data occupying small elemental areas of a larger area, a lens, a scanner having a reflective surface, means to rotate the scanner about an axis, means to retain the area in a convex curved condition facing said scanner with the center of curvature being behind said surface, said axis and the plane of said reflective surface being related to each other and to said center of curvature that the total length of the reflected image-defining rays from each elemental area to the lens along the optical axis of the lens are equal for all the elemental areas of the line that are scanned, the relation being such that the portion of the reflective surface which reflects light from the curved surface of the data area along the optical axis of the lens, moves closer to the data area as it moves further from the lens, and vice versa, so that said total length remains substantially constant as the area is scanned, a second similar scanning means, and means to operate said second scanning means out of phase with said first-mentioned scanner.

12. The optical projection system of claim 11 wherein said second scanning means operate in a direction opposite the first-mentioned scanning means.

13. The optical projection system of claim 10 wherein said scanner reflective surface moving means is a driver, a resonant rod supporting said surface, said driver being operatively associated with said rod to oscillate the rod and bring it into and hold it in resonance whereby the reflective surface is correspondingly oscillated.

References Cited in the file of this patent

UNITED STATES PATENTS

| | | |
|---|---|---|
| 1,825,953 | Hallongren | Oct. 6, 1931 |
| 1,855,370 | Trenor | Apr. 26, 1932 |
| 2,059,221 | Fessenden | Nov. 3, 1936 |
| 2,090,853 | Priess | Aug. 24, 1937 |
| 2,192,376 | Harding | Mar. 5, 1940 |
| 2,508,650 | Pratt et al. | May 23, 1950 |
| 2,600,168 | Klyce | June 10, 1952 |
| 2,746,749 | Huck | May 22, 1956 |
| 2,769,922 | Peery | Nov. 6, 1956 |
| 2,844,648 | Rosenthal | July 22, 1958 |
| 2,859,653 | Blackstone et al. | Nov. 11, 1958 |
| 2,909,972 | De Lano | Oct. 27, 1959 |
| 3,051,044 | McNaney | Aug. 28, 1962 |
| 3,087,987 | Stone | Apr. 30, 1963 |